(No Model.)
E. A. SOUTHWORTH & W. H. BLODGETT.
VEHICLE TOP.
No. 506,562.                                Patented Oct. 10, 1893.
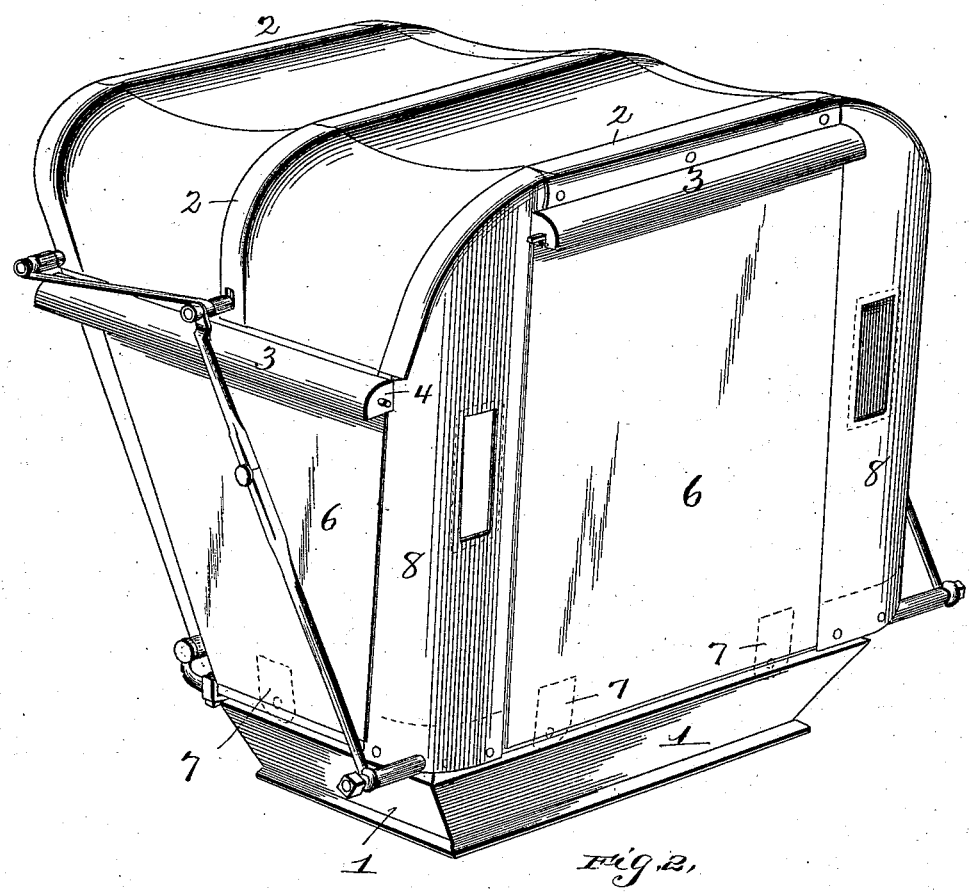
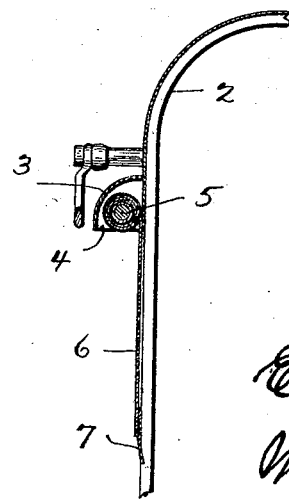
Witnesses:
John O. Melby
Anton O. Melby
Inventors:
Edward A. Southworth
William H. Blodgett

United States Patent Office.

EDWARD A. SOUTHWORTH AND WILLIAM H. BLODGETT, OF WHITEHALL, WISCONSIN.

VEHICLE-TOP.

SPECIFICATION forming part of Letters Patent No. 506,562, dated October 10, 1893.

Application filed October 10, 1892. Serial No. 448,470. (No model.)

*To all whom it may concern:*

Be it known that we, EDWARD A. SOUTHWORTH and WILLIAM H. BLODGETT, citizens of the United States, and residents of Whitehall, in the county of Trempealeau and State of Wisconsin, have invented new and useful Improvements in Vehicle Tops or Canopies, of which the following is a full, clear, and exact description.

The object of the invention is to provide a vehicle top or canopy with spring operated side and rear curtains and with stationary corner pieces, in such manner that the curtains may be readily raised and lowered by the occupant of the vehicle, and when lowered, in connection with the said corner pieces, they form a complete protector for the vehicle.

The invention consists in the novel construction and combination of parts hereinafter fully described and claimed.

In the accompanying drawings Figure 1 is a perspective view of a vehicle top or canopy constructed in accordance with our invention. Fig. 2 is a detail cross sectional view of one of the side curtains.

In the said drawings, the reference numeral 1 designates the seat railing of an ordinary buggy, and 2 the U-shaped supporting bars, connected at their ends with the said railing as is usual in this class of vehicles. Secured to these bars at each side and in the rear, is a curved casing or protector 3, made of sheet metal, closed at its ends by plates 4, and open at the bottom. Located in this protector or casing and journaled in the end plates 4, is a spring roller 5, of any ordinary or suitable construction, to which is secured one end of a curtain 6, having tabs 7, secured to its free edge or end, provided with button holes to engage with buttons or studs on the railing 1.

Secured to each end of the rear supporting bar 2, at its upper end, is a stationary corner piece 8, secured at its lower end to the meeting ends of the side and cross boards forming the railing 1 in such manner that when the curtains are lowered the vertical or side edges thereof will meet the edges of the curtains, as seen in Fig. 1, and thus form a complete housing or protector for the occupant of the vehicle.

We are aware that it is not broadly new to provide a buggy top with a spring operated curtain, and therefore do not broadly claim such.

What we claim is—

The combination with the seat railing and the supporting bars, of the housing secured thereto at the sides and rear, the spring-roller located and journaled therein and provided with tabs having button-holes therein, and the corner-pieces secured to each end of the supporting-bars, and to the meeting ends of the side and cross boards comprising the seat railing, substantially as specified.

EDWARD A. SOUTHWORTH.
WILLIAM H. BLODGETT.

In presence of—
 E. N. TROWBRIDGE,
 L. H. WHITNEY.